(12) United States Patent
Walton

(10) Patent No.: US 9,804,917 B2
(45) Date of Patent: Oct. 31, 2017

(54) NOTIFICATION OF ADDRESS RANGE INCLUDING NON-CORRECTABLE ERROR

(71) Applicant: Hewlett-Packard Development Company, L.P., Houston, TX (US)

(72) Inventor: Andrew Christopher Walton, Rocklin, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/430,877

(22) PCT Filed: Sep. 25, 2012

(86) PCT No.: PCT/US2012/057107
§ 371 (c)(1),
(2) Date: Mar. 24, 2015

(87) PCT Pub. No.: WO2014/051550
PCT Pub. Date: Apr. 3, 2014

(65) Prior Publication Data
US 2015/0234702 A1  Aug. 20, 2015

(51) Int. Cl.
*G06F 11/07* (2006.01)
*G06F 12/06* (2006.01)

(52) U.S. Cl.
CPC ........ *G06F 11/0793* (2013.01); *G06F 11/073* (2013.01); *G06F 12/0646* (2013.01); *G06F 2212/1032* (2013.01)

(58) Field of Classification Search
CPC .. G06F 11/0793; G06F 3/0619; G06F 3/0628; G11C 29/56008; G11C 16/14; G11C 16/344; G11C 16/349
See application file for complete search history.

(56) References Cited

U.S. PATENT DOCUMENTS 6,405,322 B1  6/2002  Gaither et al.
6,594,785 B1  7/2003  Gilbertson et al.
(Continued)

FOREIGN PATENT DOCUMENTS

CN  1752936  3/2006
CN  101599305  12/2009
(Continued)

OTHER PUBLICATIONS

Jim Mitchell; IBM Power6 Processor-based Systems: Designing and Implementing Serviceability; Jun. 11, 2007, http://www-05.ibm.com/cz/power6/files/zpravy/WhitePaper_POWER6_serviceability.PDF., 13pp.
(Continued)

*Primary Examiner* — Loan L. T. Truong
(74) *Attorney, Agent, or Firm* — Hewlett Packard Enterprise Patent Department

(57) ABSTRACT

Techniques are provided for recovering from non-correctable memory errors. A memory location may be accessed. It may be determined that the memory location contains a non-correctable error. A range of addresses associated with the memory location may be determined. Corrective action may be taken on the entire range of addresses to identify other addresses within the range of addresses that contain non-correctable memory errors.

20 Claims, 7 Drawing Sheets

(56) References Cited

U.S. PATENT DOCUMENTS

| | | | |
|---|---|---|---|
| 6,697,979 B1* | 2/2004 | Vorbach | G01R 31/31850 714/10 |
| 6,829,181 B1* | 12/2004 | Seitoh | G11C 29/38 365/201 |
| 7,539,909 B2* | 5/2009 | LeClerg | G11C 29/26 714/718 |
| 7,546,487 B2 | 6/2009 | Marisetty et al. | |
| 7,568,135 B2* | 7/2009 | Cornwell | G11C 11/5628 365/185.01 |
| 7,573,754 B2* | 8/2009 | Kim | G11C 11/56 365/189.07 |
| 7,734,966 B1* | 6/2010 | Lee | G11C 29/12015 365/201 |
| 8,122,295 B2* | 2/2012 | Kim | G06F 11/1048 714/21 |
| 8,122,308 B2 | 2/2012 | Buch | |
| 8,484,542 B2* | 7/2013 | d'Abreu | G06F 11/1012 714/763 |
| 8,566,671 B1* | 10/2013 | Ye | G06F 11/1048 714/764 |
| 8,694,855 B1* | 4/2014 | Micheloni | G06F 11/1048 714/704 |
| 8,811,074 B2* | 8/2014 | Goss | G11C 16/26 365/185.02 |
| 8,966,343 B2* | 2/2015 | Syu | G11C 16/349 365/185.09 |
| 9,208,028 B2* | 12/2015 | Oh | G06F 11/141 |
| 9,223,656 B2* | 12/2015 | Kim | G06F 11/1402 |
| 9,323,607 B2* | 4/2016 | Cai | G06F 11/1024 |
| 9,378,829 B2* | 6/2016 | Kalderon | G11C 16/102 |
| 2005/0015672 A1 | 1/2005 | Yamada | |
| 2005/0138487 A1 | 6/2005 | Vaid et al. | |
| 2005/0149824 A1* | 7/2005 | Arnez | H03M 13/096 714/758 |
| 2007/0088988 A1 | 4/2007 | Gupta et al. | |
| 2007/0118778 A1* | 5/2007 | Young | G11C 29/16 714/100 |
| 2007/0195618 A1* | 8/2007 | Krech, Jr. | G01R 31/31926 365/200 |
| 2007/0260828 A1* | 11/2007 | Swaminathan | G06F 13/1668 711/154 |
| 2007/0277065 A1* | 11/2007 | Sato | G11C 29/44 714/703 |
| 2008/0082883 A1* | 4/2008 | Gorman | G11C 29/44 714/733 |
| 2008/0104459 A1* | 5/2008 | Uchikawa | G06F 11/1068 714/721 |
| 2008/0294951 A1* | 11/2008 | Ahmad | G11C 29/10 714/719 |
| 2009/0070630 A1 | 3/2009 | Khatri et al. | |
| 2009/0199056 A1* | 8/2009 | Murata | G06F 11/1008 714/704 |
| 2009/0254776 A1 | 10/2009 | Gonzalez et al. | |
| 2010/0037097 A1 | 2/2010 | Kobayashi et al. | |
| 2010/0125765 A1* | 5/2010 | Orbach | G06F 11/1048 714/718 |
| 2010/0313061 A1* | 12/2010 | Huth | G06F 11/073 714/2 |
| 2011/0055827 A1 | 3/2011 | Lin et al. | |
| 2011/0066899 A1* | 3/2011 | Kang | G06F 11/1068 714/54 |
| 2011/0078492 A1* | 3/2011 | Kumar | G06F 12/0817 714/5.11 |
| 2011/0126080 A1* | 5/2011 | Wan | G11C 11/5628 714/763 |
| 2011/0191654 A1* | 8/2011 | Rub | H03M 13/05 714/773 |
| 2011/0271152 A1* | 11/2011 | Hattori | G06F 11/079 714/53 |
| 2011/0289383 A1* | 11/2011 | Dhuse | H04L 9/085 714/763 |
| 2012/0023364 A1* | 1/2012 | Swanson | G06F 11/1008 714/6.12 |
| 2012/0036404 A1* | 2/2012 | Tabata | G11C 29/56 714/722 |
| 2012/0066567 A1* | 3/2012 | Moyer | G06F 11/1076 714/763 |
| 2012/0072794 A1* | 3/2012 | Eguchi | G06F 11/073 714/721 |
| 2012/0117307 A1* | 5/2012 | Eguchi | G11C 16/107 711/103 |
| 2012/0137168 A1 | 5/2012 | Lu | |
| 2012/0185740 A1* | 7/2012 | Hsu | G06F 11/1048 714/719 |
| 2012/0198272 A1* | 8/2012 | Zbiciak | H03K 19/0016 714/6.11 |
| 2013/0007507 A1* | 1/2013 | Raj | G06F 11/0715 714/5.11 |
| 2013/0044534 A1* | 2/2013 | Kawai | G11C 13/0007 365/148 |
| 2013/0060996 A1* | 3/2013 | Berke | G06F 3/0683 711/105 |
| 2013/0151767 A1* | 6/2013 | Berke | G06F 11/1048 711/105 |
| 2013/0275832 A1* | 10/2013 | D'Abreu | G06F 11/1012 714/764 |
| 2013/0290793 A1* | 10/2013 | Booth | G06F 11/1048 714/54 |

FOREIGN PATENT DOCUMENTS

| | | | |
|---|---|---|---|
| JP | H05-265876 | 10/1993 | |
| JP | 2000-011677 | 1/2000 | |
| JP | 2010-039895 | 2/2010 | |
| JP | 2011233007 | 11/2011 | |
| KR | 20110073942 | 6/2011 | |
| WO | WO 2014193412 A1 * | 12/2014 | G06F 11/073 |

OTHER PUBLICATIONS

PCT/ISA/KR, International Search Report mailed May 1, 2013, PCT/US2012/057107.

European Patent Office, "Extended European Search Report", US2012057107, May 23, 2016, 8 pages.

* cited by examiner

NOTIFICATION OF ADDRESS RANGE INCLUDING NON-CORRECTABLE ERROR

BACKGROUND

Machine check architecture is a technique that may be used in modern computing systems to detect failures, such as failures in memory. In many computing systems, memory is protected by an Error Correcting Code (ECC). Error correcting codes typically in use can detect and correct single bit errors. In the case of a multi bit error, the ECC may be able to detect the error, but is unable to correct the error. In a system utilizing machine check architecture, when a memory location containing a non-correctable error is discovered, a special value, called a poison signature, or simply poison, is placed in the memory location. The poison signature is typically generated by manipulating the ECC bits. The non-correctable error in the data may be identified by the memory controller, CPU cache, IO Devices, or in any number of other elements and any of those elements can generate a poison signature in the data.

A system may be able to run for a long period of time, even in the presence of poison. However, when the central processing unit (CPU) attempts to use a memory location containing poison, a machine check exception may be generated by the processor. The machine check exception may be intercepted by the firmware or operating system of the computing device. In some cases, no corrective action can be taken and the entire system may crash. However, in other cases, the operating system may be able to take recovery action. For example, the operating system may kill the specific process that was using the memory location that was determined to contain poison.

DETAILED DESCRIPTION

Figure 1:
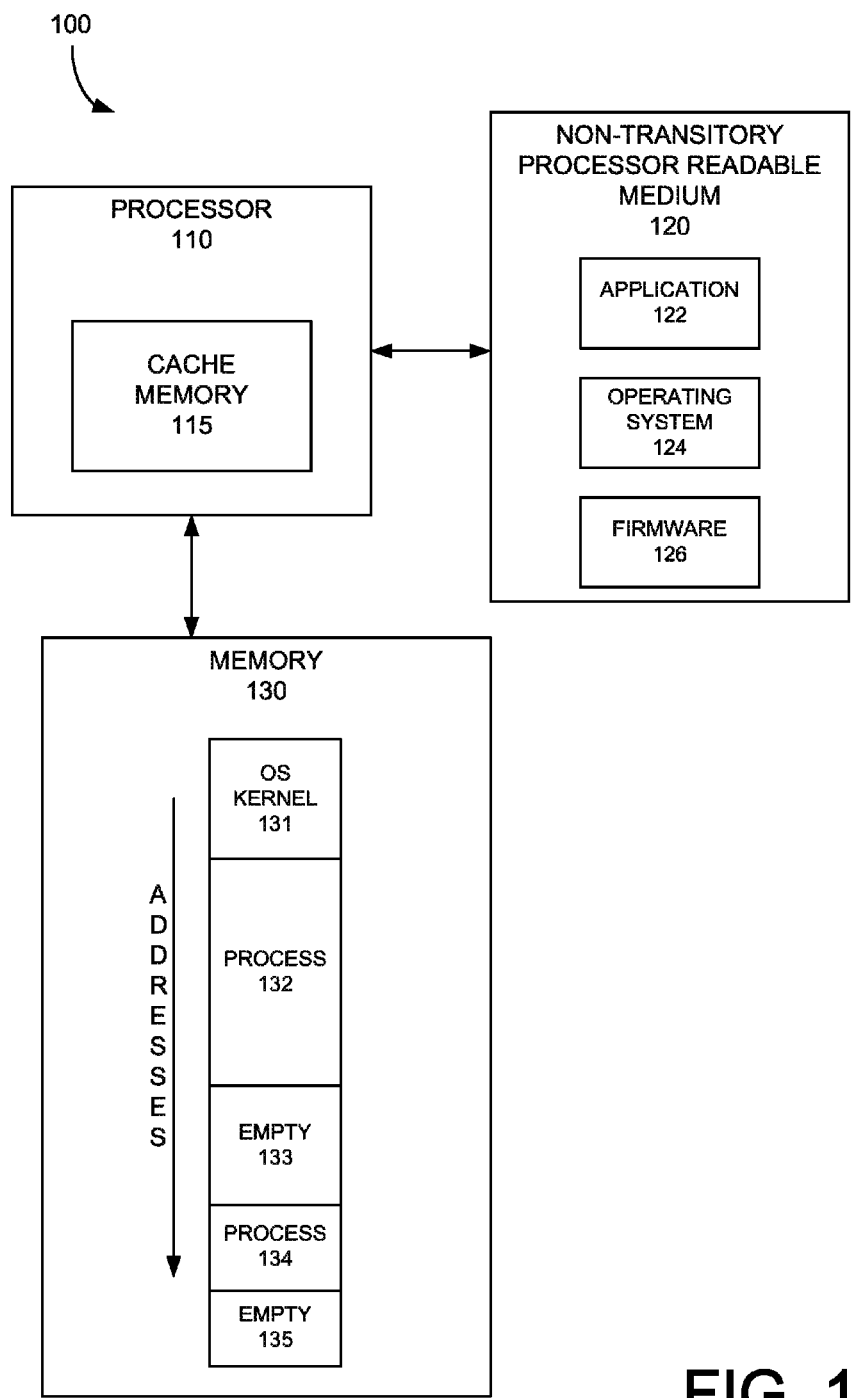
FIG. 1 is an example of a system in accordance with the techniques described herein.

The use of poison in a machine check architecture system is very useful in detecting memory containing non-correctable errors and preventing the CPU from using memory that contains an error. In some cases, the memory may contain a data value that is used by software. Use of a corrupted data value may cause incorrect results to be obtained. In other cases, the memory location may contain an instruction that is to be executed by the CPU. In such a case, the instruction contained in the memory location is essentially a random instruction, because it cannot be determined how the error altered the instruction. With ECC the corrupt instruction can be identified but not necessarily corrected.

As mentioned above, the typical action taken by an operating system upon receipt of a machine check exception is to purge the process that was using the affected memory location. Purging the process typically means stopping operation of the process and freeing up all resources, such as memory that were allocated to the process. However, several problems arise when a process is simply purged due to the presence of poison. One problem that arises is that once the operating system has purged the process, the memory in use by the process is left in an unknown state. The memory may contain further errors, in which case attempting to use the memory by a different process would result in additional machine check exceptions. Another problem is that the memory used by the process is likely to have poison and if the OS assigned that memory region to another process, the process could step into the poisoned memory. The operating system in current systems, do not usually know enough about the memory controller to cleanse the purged process' memory of poison.

The operating system has two options. First, the memory that was in use by the purged process may be declared as unusable. In such a case, the operating system no longer attempts to use that memory. In systems that run a long time between reboots, this may cause numerous gaps to appear in the memory map as more and more processes are purged and their memory resources marked as unavailable. In the second option, the operating system may purge the process, but allow continued use of the memory, even though there may be an actual problem with the memory hardware that caused the poison in the first place. Blindly reusing the memory may cause the generation of additional machine checks if no steps are taken to ensure the memory is free of poison and free of faults that would cause an uncorrected error.

The above discussion assumed that the process that was using the memory which contained an error could be purged in the first place. If poison is detected in a sensitive process, such as the operating system kernel, purging the process generally results in a system crash. In many cases, designers of operating systems provide a memory dump of the memory in use by a critical process, such as the kernel, when the critical process is purged. This dump allows an expert to analyze what the critical process was doing at the time of the failure and better debug the failure. However, if the memory used by the critical process contains additional errors, the mere act of accessing the memory to dump the contents may cause additional machine check exceptions.

Further exacerbating the problem with machine check exceptions caused by poison is the fact that the mere generation of poison is not a reason in and of itself to purge a process. For example, a memory controller may detect an error in memory when attempting to pre-fetch cache lines for a CPU cache. The memory controller may then replace the memory containing the error with a poison signature and load the cache with the poison signature. At this point, the system knows that poison has been generated, but has no way of determining if and when that poison will be consumed. For example, the process may never attempt to access the pre-fetched cache line, thus never generating a machine check exception. Furthermore, the system has no definitive way to determine if the operating system was able to recover from the consumption of poison by purging the process which consumed the poison.

The techniques described herein overcome the above mentioned problems with recovering from a machine check exception caused by the consumption of poison. When such an exception occurs, the operating system may inform the system firmware, which acts as an abstraction layer between the operating system and the hardware, that a machine check exception has been received. The operating system may also inform the firmware if the process has been successfully purged or if other recovery action, such as a dump of memory, will occur. In addition, the operating system may inform the firmware of the range or ranges of memory addresses that were in use by the process that is to be purged.

The system firmware may then examine the range of memory addresses provided by the operating system. The firmware may determine if the memory contains additional errors and reinitialize the memory range, clearing the memory range of poison generated for previous errors. The system firmware may also test the memory to determine if the error was caused by an actual defect in the memory. The firmware may also purge all other locations, such as cache memory, that may contain corrupted data. Once the memory clean up has been performed, the firmware may report the results back to the operating system. The results may include which ranges of memory were successfully cleaned up, and which ones were not.

The operating system may then use the information provided by the firmware to either return the memory to a usable state or to mark the memory as unusable. Memory that was indicated by the firmware as having been successfully tested can be returned to the operating system to be reused for a different process.

In some cases, the process using the memory that contains an error cannot be purged. For example, the process running the operating system kernel cannot be purged directly, as this may cause a system crash. In such cases, the operating system may inform the firmware of a range of memory addresses that are to be dumped for later analysis. In this case, the firmware may not attempt to reinitialize the memory, but rather simply notes memory locations that contain the poison signature or that will cause additional uncorrected errors if the OS were to access them. This information may be provided to the operating system, which in turn may avoid the memory locations containing poison or errors when dumping the memory.

FIG. 1 is an example of a system in accordance with the techniques described herein. The system 100 may be a computing system as would be found in a server computer or personal computer. System 100 may also be any other type of computing device, such as a Smartphone, tablet, personal digital assistant, or any other such device. The techniques described herein are not limited to any particular type of device, but rather are applicable to any type of device that contains the types of dements that are described below.

System 100 may include a processor 110, a non-transitory processor readable medium 120, and a memory 130. The processor may be any type of processor that is able to retrieve and execute processor readable instructions. Furthermore, the processor may be of a type that is able to detect memory errors and notify other components of the system of those errors. For example, the processor may follow a machine check architecture, in which memory that contains uncorrectable errors is marked with a special signature called a poison signature. A poison signature is typically created by altering the ECC bits of the cache line containing the memory error with a pattern that can be recognized as poison. When the processor consumes the poison, an exception, such as a machine check exception, may occur. The firmware and operating system, as will be described below, may receive the exception and take corrective action. The processor may also include a cache memory 115. The cache memory may be a memory that is located on the processor die itself and may allow for fast access to data. Use of the cache memory is described in further detail below.

The system may also include a non-transitory processor readable medium 120 containing a set of instructions thereon. When these instructions are executed by the processor, the processor may implement the functionality described herein. The medium may include applications 122, operating systems 124, and firmware 126. Applications may provide the functionality of the system 100. For example, in a web hosting server, the application may be the web server. The techniques described herein are not limited to any particular type of application. What should be understood is that the applications are programs that run on the system and provide the functionality desired by the end user.

The medium may also include an operating system. The operating system may manage the resources of the system 100. For example, the operating system may manage the applications that are running on the system by allocating resources, such as memory, to those applications. The operating system may also provide applications with various capabilities through operating system application programming interfaces (API). Through these APIs, applications may gain access to the resources of the computing system. The operating system may keep track of all resources of system 100 and determine which resources are available and which resources are in use, or unavailable.

The operating system 124 may interface with the processor, and other components of the system 100, through the use of firmware 126. The firmware may be software instructions that provide a layer of abstraction between the hardware and the operating system. For example, the operating system may wish to utilize a capability of the underlying hardware. The operating system may interface with the firmware, which has a greater degree of integration with the hardware, to request the capability. The firmware has a greater level of knowledge about the hardware, and is thus able to take generalized resource requests from the operating system and translate those requests into the specific hardware level commands that are needed. The firmware may also be able to execute commands on the hardware that are not typically available to the operating system. For example, the firmware may be able to enable and disable capabilities of the hardware.

The system 100 may also include a memory 130. The memory is typically random access memory which may be used by the processor. In a typical computing system, the processor instructions that are stored on the non-transitory processor readable medium 120 are typically loaded into memory 130 prior to execution by the processor. The memory can typically be accessed by the processor much more quickly than can be achieved by accessing the medium 120.

An application is typically run as a process that is managed by the operating system. The operating system may allocate a range of memory addresses for use by the application. As shown, there are two example application processes, 132, 134. These processes could be any type of application, such as a web server, a word processing program, or any other type of application. As shown in FIG. 1, the processes occupy a range of memory addresses. Although the range of memory addresses is shown as a contiguous range, this is for purposes of ease of description. The range of memory addresses may be non-contiguous. For example, there may be sections of empty 133, 135 memory addresses between the memory allocated to a process. For the remainder of this description, the range of addresses used by a process means all memory allocated to the process, regardless of if the memory is in one or more contiguous ranges.

Although processes have been described in terms of applications, the operating system itself is a process. Just as with any other process, the operating system may itself be allocated memory 131 to store the instructions used to provide the functionality of the operating system. From the perspective of the hardware, the operating system is essentially just another process that is to be run.

In operation, the processor may load instructions and data from the memory. In processor architectures that contain cache memory, memory contents may be loaded into the cache for faster access by the processor. Typically, the contents of memory are moved to and from the processor processor cache in units of multiple bytes that may be referred to as a cache line. For example, a collection of 8 bytes of memory may be grouped together as a cache line. However, it should be understood that the techniques described herein are not limited to cache lines of any given size. A cache line may be protected by an ECC. As mentioned above, an ECC can typically detect and correct single bit errors in a cache line. As such, single bit errors are not described further. In the case of a multiple bit error, the ECC may be able to detect the error, but is not able to correct it. A multiple bit error in a cache line may be referred to as a non-correctable error.

There are many sources of errors in memory. One possible source is high energy particles. A high energy particle may cause one or more bits stored in a memory location to change values, thus causing the memory to contain an incorrect value. Another possible source of errors is malfunctioning memory chips. Yet another source of errors may be Input/Output devices (not shown) that may directly access the memory and store data incorrectly. Furthermore, bugs in application software, the operating system, or firmware may cause errors in the memory.

Errors in memory may be detected through a number of mechanisms. For example, many processor architectures contain scrubber hardware that may step through each cache line in memory. Through the use of the ECC, the scrubber may determine that there is an error in memory. If the error is of a non-correctable type, meaning a multi-bit error, the scrubber may replace the contents of the cache line with a poison signature indicating that the memory has been corrupted. Likewise, when a cache line is loaded from memory into the processor or processor cache, the hardware that is used to load the memory may determine that there is a non-correctable error in the cache line. Again, the cache line may be replaced with a poison signature. When a corrupted cache line is evicted from a processor cache, the CPU cache controller may poison the cache line before it is sent back to memory. Other possible reasons for the generation of poison signatures would be known to a person of skill in the art. What should be understood is that when a non-correctable error is discovered in a cache line, the line may be replaced with a poison signature.

At some point, the processor may attempt some type of access on the cache line that contains a poison signature. The processor may load the cache line directly from memory or from the processor cache. The access operation could be either trying to execute an instruction stored in the cache line or to use a data value stored in the cache line. The attempt to access the cache line containing the poison signature is referred to as the consumption of poison. In processors that follow a machine check architecture, the consumption of poison causes the processor to generate a machine check exception. The machine check exception may be passed from the processor hardware to the firmware. The firmware may then pass the indication of the machine check exception to the operating system.

Once the operating system has received the indication of the machine check exception, the operating system must first decide if the error is recoverable. As mentioned above, each process is allocated a range of memory addresses. The machine check exception identifies the particular memory location that contained poison. As such, the operating system is able to determine which process, and the associated memory range, was the cause of the machine check exception.

In some cases, the operating system may be able to recover from the machine check exception by purging the process that caused the exception. Purging a process typically involves causing the process to stop and releasing all resources in use by the process. Purging the process may also be referred to as killing the process. However, it is at this point that the problems described above with respect to machine check exceptions occurs. Even if the operating system is able to purge the process, the memory that was in use by the process may still contain errors. For example, if the memory chips that contain the cache line that caused the poison to be generated is actually faulty, there is a very good possibility that other cache lines in the address range used by the process also either contain the poison signature or contain errors that would result in the generation of poison.

It may be desirable for the operating system to first clean and verify the memory that was in use by the process that was purged prior to making that memory available for other processes. In one example implementation, the operating system may send to the firmware an indication that poison was consumed and that the operating system is attempting to recover by purging the process that contained the cache line with poison. The operating system may inform the firmware of the range of memory addresses that was in use by the process that was purged. In other words, the processor may inform the firmware of the range of memory addresses that need to be checked for the presence of poison, or other errors.

Upon receipt of this indication, the firmware may attempt to clean up the range of memory addresses that were in use by the purged process. In some example implementations, as part of the clean up, the firmware may temporarily disable the generation of poison and the detection of poison consumption within the processor. As explained above, the firmware is tightly integrated with the processor and is thus able to control these lower levels of functionality. The firmware may disable machine check exceptions during the clean up process because the mere act of cleaning up the memory may otherwise cause additional machine check exceptions. For example, assume that a memory chip that contains several cache lines associated with the purged process is faulty, and as such has many errors. In the process of attempting to clean up the memory, the memory would be accessed. If machine check exceptions were enabled, accessing the memory to clean it up would cause additional machine check exceptions.

In one example implementation, the firmware may attempt to clean up the range of memory addresses by initializing the range of memory addresses, just as would have been done during startup of the system. In other words, the memory may be initialized to what is a known good value which contains no errors. When this initialization is done, the memory controller may be put into a mode that initializes the ECC bits to a known-good state, free of poison. The firmware may then test the range of memory addresses to determine if the known good value was able to be properly stored in the range of memory addresses. In the case of a transient fault, the test should succeed. However, in the case of a persistent fault, such as a defective memory chip, the initialization may fail. In any case, the firmware may be able to determine which memory locations were able to be successfully initialized and which ones were not.

The firmware may then pass this information back to the operating system. The operating system may then mark memory locations that were successfully initialized as now being available for use by other processes. Memory locations that were not successfully initialized may be marked as unavailable for use.

In addition to cleaning up the memory itself, the firmware may also clean up any locations to which the memory containing the poison signature or containing errors has propagated. As explained above, in some processor architectures, memory is not read directly, but rather is first read into a processor cache and from there is read by the processor. If there is a poison signature in the cache line in memory, that poison signature would also appear in the processor cache. Thus the firmware may also examine the processor cache for the presence of poison, and if found may purge the cache lines containing poison from the processor cache. The firmware might also flush all of the CPU caches before attempting to clean up poison in memory.

The processor cache is checked for the presence of poison or other errors because it is possible that faulty cache lines may have been loaded into the processor cache, such as through a pre-fetch operation, but were never actually consumed by the processor. Thus, by reviewing all locations were a corrupt cache line may be, such as the memory and processor cache, all faulty cache lines may be detected, even if those cache lines did not cause a machine check exception.

In some cases, recovery by purging the process is not possible. For example, if the process associated with the memory that caused the machine check exception is the operating system process itself, purging the process immediately would result in the system crashing. Although the consumption of poison may leave no alternative to crashing the system, many operating systems attempt to dump debugging information into a log file prior to crashing. This debugging information may be useful to the engineers to determine what was occurring in the system prior to the crash.

One common technique used is to dump a core file, which contains the contents of memory of the operating system process. The operating system may read the memory associated with the operating system process and write the contents of the memory to a file, prior to crashing. However, just as above, the mere act of accessing the memory in order to dump it may cause additional machine check exceptions. The techniques described herein may be altered slightly to allow the contents of memory to be dumped.

The operating system may again send an indication to the firmware that a process is going to be purged and the range of addresses used by the process. However, the indication may also include the fact that the operating system is not going to try to recover from the error. In this case, the firmware may not attempt to reinitialize the memory, as this would defeat the purpose of dumping the memory to a file. Rather, the firmware may examine the range of memory addresses to determine which addresses contain poison or non-correctable errors. The memory locations that contain non-correctable errors may be sent back to the operating system. When the operating system attempts to dump the contents of the memory to a file, the memory locations indicated as containing errors may be skipped, thus preventing the generation of additional machine check exceptions. Although this results in less than a complete dump of the memory in use by the operating system, the results are better than a system crash with no debugging data produced at all.

In addition to the recovery techniques described above, the firmware may also keep track of memory locations that have previously been determined to contain poison. For example, assume that a memory chip is defective and as such results in the continuous generation of poison each time memory on that chip is used. The first time poison is detected, the operating system may purge the process and return the memory to use (assuming the failure is of a type that is able to pass the initialization and test). The operating system may assign that memory location to a different process, again resulting in poison generation. The firmware may keep track of memory locations that are consistently generating poison, and may indicate those locations as faulty, even if they are able to pass initialization.

Figure 2:
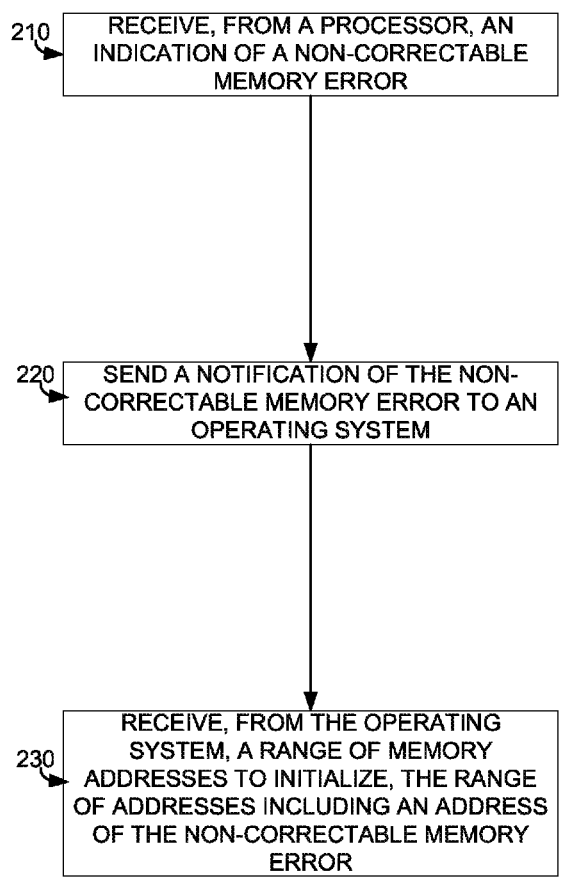
FIG. 2 is an example of a high level flow diagram for processing non-correctable memory errors.

FIG. 2 is an example of a high level flow diagram for processing non-correctable memory errors. In block 210, an indication of a non-correctable memory error may be received from a processor. For example, in the case of a system utilizing machine check architecture, the indication may be a machine check exception caused by the consumption of poison. In block 220, a notification of the non-correctable memory error may be sent to an operating system. For example, the notification may be the machine check exception and the notification could be sent to an exception handler of the operating system.

In block 230, a range of memory addresses to be initialized may be received from the operating system. The range of addresses may include the address of the non-correctable memory error indicated in block 210 above. As explained above, the range of memory addresses may be the range of memory addresses used by the process that is associated with the memory location that included the non-correctable memory error.

Figure 3:
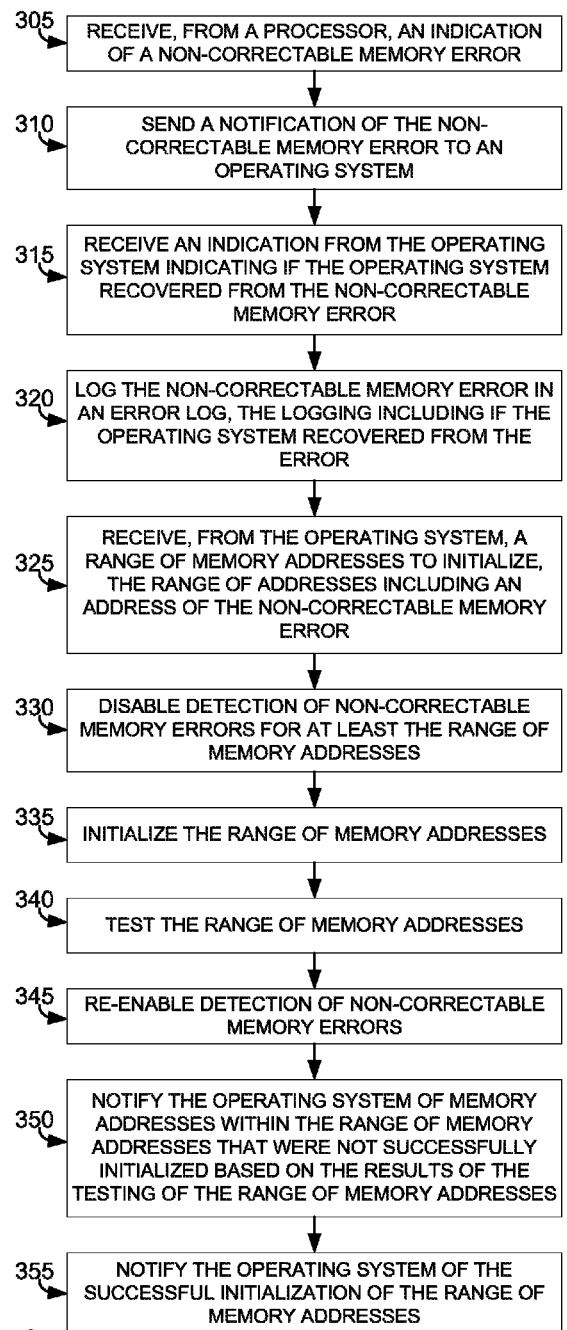
FIG. 3 is an example of a high level flow diagram for initializing memory based on the detection of non-correctable errors.

FIG. 3 is an example of a high level flow diagram for initializing memory based on the detection of non-correctable errors. In block 305, just as above, an indication of a non-correctable memory error may be received from a processor. In block 310, a notification of the non-correctable memory error may be sent to an operating system. In block 315, an indication may be received from the operating system indicating if the operating system is able to recover from the non-correctable memory error. As explained above, recovery may include if the process was able to be successfully purged.

In block 320, the non-correctable memory error may be logged in an error log. The logging may include if the operating system was able to recover from the error. As explained above, the firmware may keep track of non-correctable memory errors to determine if there is a problem with the physical memory. If certain ranges of memory repeatedly are the case of non-correctable memory errors, the firmware may determine that there is a problem with the physical memory, and may remove that memory from service or tell the OS to stop using that memory.

In block 325, a range of memory addresses may be received from the operating system. The range of memory addresses may include the address of the non-correctable memory error. This range of addresses may be the memory addresses that were being used by the process that has been purged due to the non-correctable memory error. In block 330, detection of non-correctable memory errors may be disabled for at least the range of memory addresses. As explained above, when the firmware is attempting to clean up the range of memory addresses, it would be counterproductive for firmware to take a nested machine check, as the memory is going to be reinitialized, tested and cleared of poison.

In block 335, the range of memory addresses may be initialized. As explained above, initializing the range of memory addresses may include initializing the physical memory itself, as well as any other areas to which the poison has propagated. For example, if a cache line containing poison is present in memory as well as the CPU cache, the cache line may be flushed from the cache so that the initialization of memory eliminates the poison from the system. In block 340, the range of memory addresses may be tested. After the memory addresses have been initialized, the memory may be tested to determine if there is an actual problem with the physical memory itself that is causing the error.

In block 345, detection of non-correctable memory errors may be re-enabled. In block 350, the operating system may be notified of memory addresses within the range of memory addresses that were not successfully initialized. Successful initialization may be determined based on the tests that were performed in block 340. The operating system may declare memory that was not successfully initialized as unavailable for further use by any process. In block 355, the operating system may be notified of the successful initialization of the range of memory addresses. Thus, the memory addresses that were successfully initialized may be communicated to the operating system. The operating system may then make these ranges of memory addresses available for use by other processes.

Figure 4:
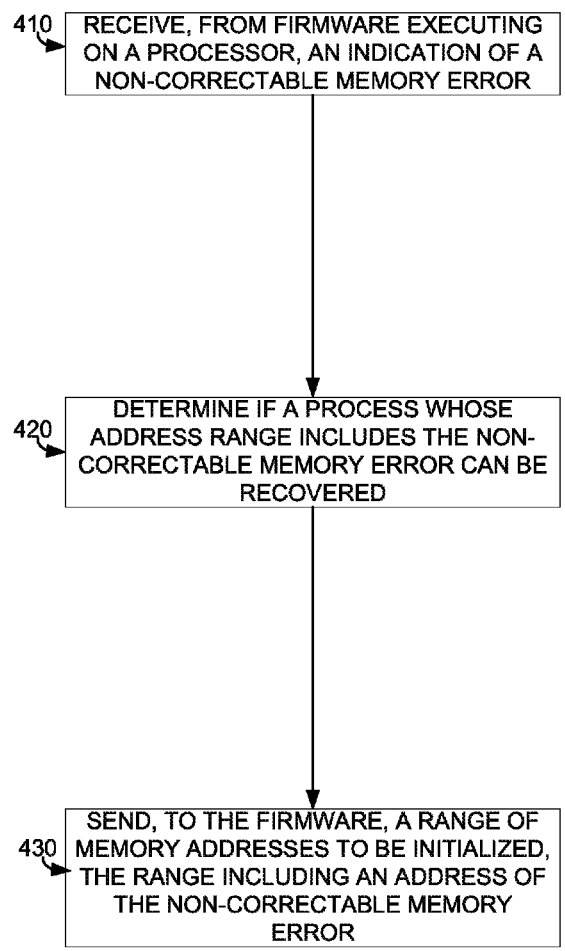
FIG. 4 is an example of a high level flow diagram of an operating system cleaning up ranges of memory addresses.

FIG. 4 is an example of a high level flow diagram of an operating system cleaning up ranges of memory addresses. In block 410, an indication of a non-correctable memory error may be received from firmware. For example, the indication could be a machine check exception if the processor architecture includes machine check. In block 420, if may be determined if a process whose address range includes the non-correctable memory error can be recovered. As explained above, recovery may include purging the process. In some cases, the process, such as the operating system kernel, cannot be purged without causing further impact to the system.

In block 430, a range of memory addresses to be initialized may be sent to the firmware. The range of memory addresses may include the address of the non-correctable memory error. As explained above, the recovery action may be to purge the process that was using the memory location that contained the error. Part of the recovery process may be to check all the memory that was in use by the process. The range of memory addresses provided may include all of the memory that was in use by the process.

Figure 5:
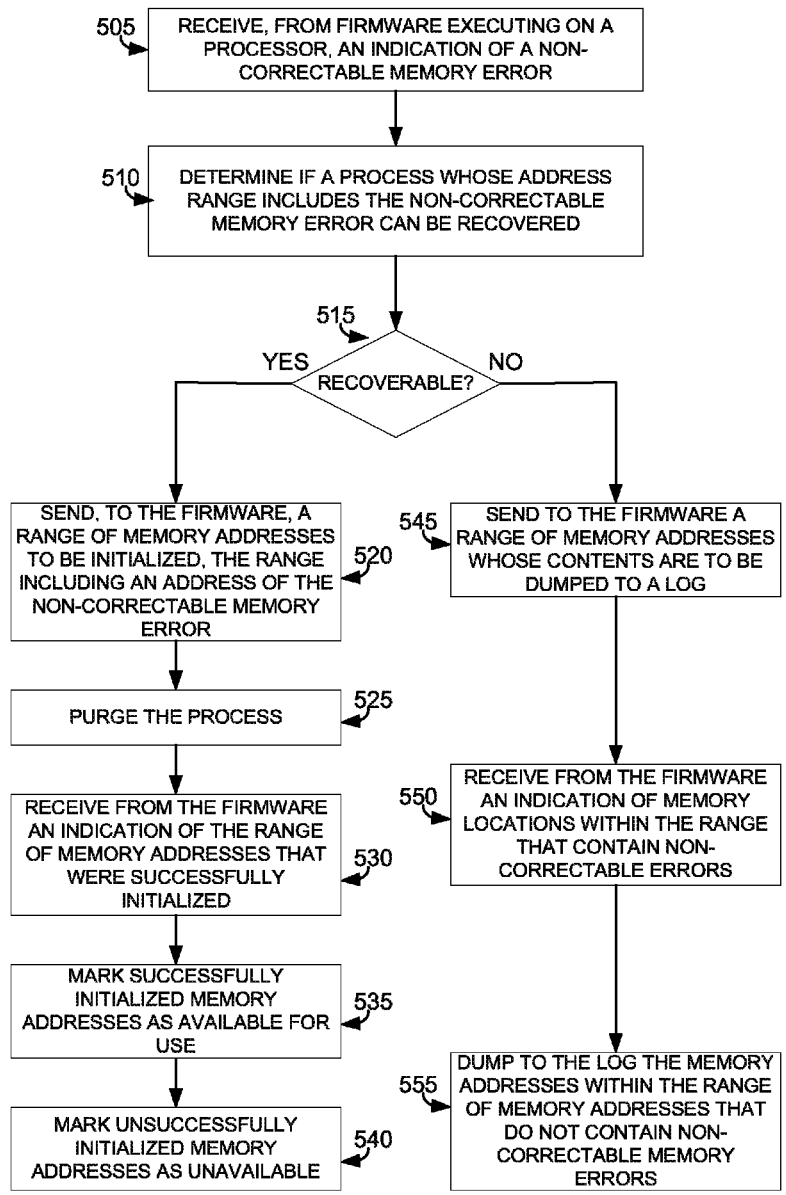
FIG. 5 is an example of a high level flow diagram for processing recoverable and non-recoverable errors caused by non-correctable memory errors.

FIG. 5 is an example of a high level flow diagram for processing recoverable and non-recoverable errors caused by non-correctable memory errors. In block 505, an indication of a non-correctable memory error may be received from firmware executing on a processor. In block 510, it may be determined if a process whose address range includes the non-correctable memory error can be recovered. A recoverable process may be a process that may be purged, while still allowing the rest of the system to continue running. For example, an application process may be purged, while still allowing other applications and the operating system itself to continue to run. However some processes, such as the operating system itself, may not be able to be purged.

In block 515, it may be determined if the process is recoverable. If not, the process moves to block 545, which is described below. If so, the process moves to block 520. In block 520, a range of memory address to be initialized may be sent to the firmware. The range may include an address of the non-correctable memory error. In block 525, the process may be purged. As explained above, purging a process may include stopping the process and freeing up all resources, such as memory, that were being used by the process.

In block 530, and indication of the range of memory addresses that were successfully initialized may be received from the firmware. In some cases, the range of memory addresses that are successfully initialized may be the same as the range of addresses sent in block 520. However, this is not always the case. In some situations, only a subset to the range of memory addresses may have been successfully initialized. In block 535, the range of memory addresses that were successfully initialized may marked as available for use. Thus the operating system may be free to reallocate the successfully reinitialized memory to other processes. In block 540, memory that was not successfully initialized may be marked as unavailable. The operating system may not attempt to allocate memory that has been marked as unavailable.

If the process that was using the memory that contained a non-correctable error is not recoverable, the process moves to block 540. In block 540, a range of memory address whose contents are to be dumped to a log may be received by the firmware. The firmware itself is not aware of the dumping process, but rather simply receives a range of memory addresses and an indication that the process will not be recovered. The actual dumping of the data to the log is done by the operating system.

In block 550, the operating system may receive from the firmware an indication of memory locations within the range that contain non-correctable memory errors. In other words, the operating system may receive memory addresses that would cause additional machine check exceptions if those memory addresses were accessed. In block 555, the memory addresses that do not contain non-correctable memory errors may be dumped to the log. In other words, the operating system is informed in block 550 of the memory locations that contain errors, and in block 555, only those locations that do not contain errors are dumped to the log. Thus, the process of retrieving the data in the memory for purposes of dumping does not cause additional machine check exceptions, because those memory locations with errors are not dumped.

Figure 6:
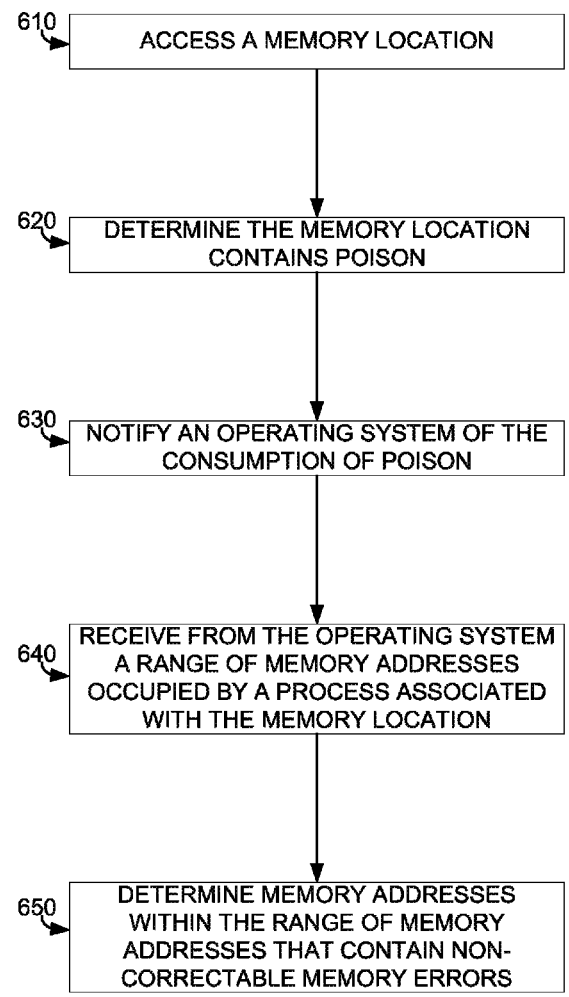
FIG. 6 is an example of a high level flow diagram for detecting poison consumption.

FIG. 6 is an example of a high level flow diagram for detecting poison consumption. In block 610 a memory location may be accessed. This access may be by a memory controller, a IO device, or any other element that may access memory. In block 620, it may be determined that the memory location contains poison. In some cases, the poison may already exist in the memory location. In other cases, when the memory location is accessed, it may be determined that there is an error in the memory. For example, the error may be detected by the ECC. If the error cannot be corrected, a poison signature may be placed in the memory location.

In block 630, an operating system may be notified of the consumption of poison. For example, when the processor attempts to utilize (e.g. consume) the memory location and detects that the memory location contains poison, the processor may cause a machine check exception. The machine check exception may be propagated to the operating system, typically through the firmware.

In block 640, a range of memory addresses occupied by a process associated with the memory location containing the poison may be received from the operating system. The operating system may have purged the process to recover from the consumption of poison, and as such, needs to check all of the memory that was in use by the process before trying to reuse the memory for other processes. In block 650, the memory addresses within the range of memory addresses that contain non-correctable memory errors may be determined.

Figure 7:
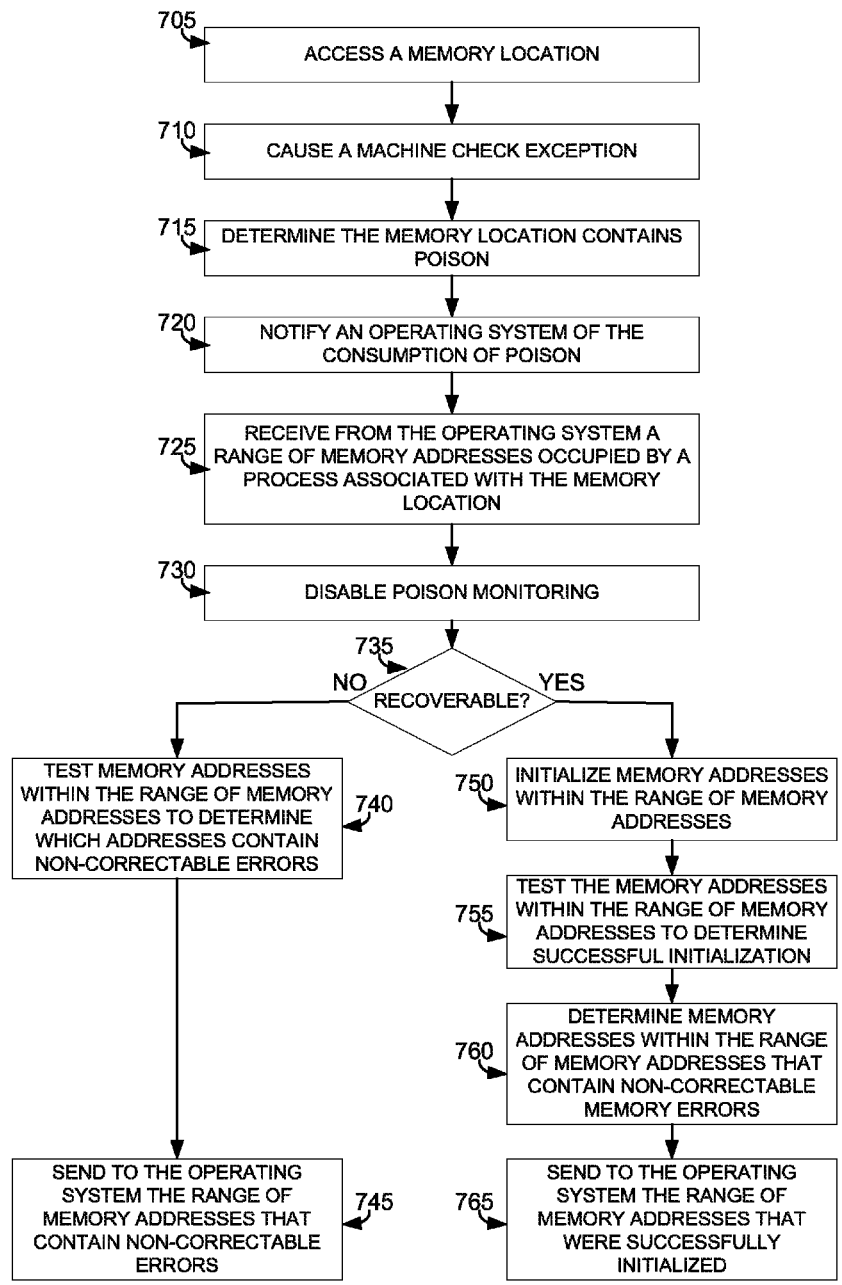
FIG. 7 is an example of a high level flow diagram for detecting poison and recovering from the poison.

FIG. 7 is an example of a high level flow diagram for detecting poison and recovering from the poison. In block 705, just as above, a memory location may be accessed. In block 710, the access of the memory location may cause a machine check exception. In block 715, it may be determined that the machine check exception was caused because the memory location contains poison and the processor has consumed the poison. In block 720, the operating system may be notified of the consumption of poison. The notification may occur by passing the machine check exception from the processor, through the firmware, to the operating system. The operating system may then attempt to take appropriate recovery.

In block 725, a range of memory addresses occupied by a process associated with the memory location may be received from the operating system. As explained above, the operating system may wish to purge the process or to dump memory that is in use by the process. The range of memory addresses may include the memory that is in use by the process. In block 730, poison monitoring may be disabled. As explained above, the process of reinitializing memory and the ECC bits used to check memory or testing the memory itself may cause additional poison generation and further machine check exceptions. Disabling poison monitoring may allow for recovery operations to proceed without generation of additional machine check exceptions.

In block 735, it may be determined if the error is recoverable. As explained above, a recoverable error is one in which the process may be purged and the memory reclaimed. A non-recoverable error is one in which the process cannot be purged, such as when the process is the operating system itself.

If the process is recoverable, the process moves to block 750, which is described below. Otherwise, the process moves to block 740. In block 740, the memory addresses within the range of memory addresses may be tested to determine which addresses contain non-correctable errors. Accessing these memory locations may not be desirable, as the access itself may cause additional machine check exceptions. In block 745, the range of memory addresses containing non-correctable errors may be sent to the operating system. The operating system may then utilize this information when dumping the memory in use by a process to avoid accessing locations that would cause additional machine check exceptions.

If the process is recoverable, the process moves to block 750. In block 750 the memory addresses within the range of memory addresses may be initialized. As explained above, initializing the memory addresses may include initializing the physical memory. In addition, locations such as a cache, to which the value in memory may have been propagated, may also be purged. In block 755, the range of memory addresses may be tested to determine if the initialization was successful.

In block 760, the memory addresses within the range of memory addresses that were not successfully initialized, and thus may contain non-correctable memory errors, may be determined. In block 765, the range of memory addresses that were successfully initialized may be sent to the operating system. The operating system may then make the successfully initialized memory available for use. In addition, the operating system may make the unsuccessfully initialized memory locations unavailable for future use.

I claim:

1. A method comprising:
receiving, from a processor, an indication of a non-correctable memory error;
sending a notification of the non-correctable memory error to an operating system;
receiving, from the operating system, a range of memory addresses to initialize, the range of addresses including an address of the non-correctable memory error;
initializing the range of memory addresses; and
testing each address of the range of memory addresses for successful initialization of the respective address.

2. The method of claim 1 further comprising:
receiving an indication from the operating system indicating if the operating system recovered from the non-correctable memory error; and
logging the non-correctable memory error in an error log, the logging including if the operating system recovered from the error.

3. The method of claim 1 wherein the indication of the non-correctable memory error is a processor machine check exception caused by the processor consuming poison.

4. The method of claim 1 further comprising:
disabling detection of non-correctable memory errors for at least the range of memory addresses before the initializing of the range of memory addresses;
re-enabling detection of non-correctable memory errors after the testing for successful initialization of each address of the range of memory addresses.

5. The method of claim 1 further comprising:
based on the testing of each address of the range of memory addresses for successful initialization, notifying the operating system of the successful initialization of each address of the range of memory addresses.

6. The method of claim 1 further comprising:
based on the testing of each address of the range of memory addresses for successful initialization, notifying the operating system of a memory address within the range of memory addresses that was not successfully initialized.

7. A method comprising:
receiving, from firmware executing on a processor, an indication of a non-correctable memory error;
determining if a process whose address range includes the non-correctable memory error can be recovered;
sending, to the firmware, a range of memory addresses to be initialized, the range including an address of the non-correctable memory error; and
receiving, from the firmware, an indication of a memory address of the range that was successfully initialized.

8. The method of claim 7 wherein if the process can be recovered, the method further comprising:
purging the process.

9. The method of claim 7 further comprising:
marking the memory address of the range that was successfully initialized as available for use; and
marking an unsuccessfully initialized memory address of the range as unavailable.

10. The method of claim 7, wherein the range of memory addresses to be initialized is a first range of memory addresses, and wherein if the process cannot be recovered, the method further comprising:
    sending to the firmware a second range of memory addresses whose contents are to be dumped to a log;
    receiving from the firmware an indication of a first subset of memory addresses within the second range that contains non-correctable errors; and
    dumping to the log a second subset of memory addresses within the second range of memory addresses that does not contain non-correctable memory errors.

11. The method of claim 7 wherein the indication of the non-correctable memory error is a processor machine check exception caused by the processor consuming poison.

12. A non-transitory processor readable medium containing thereon a set of processor executable instructions which when executed by a processor cause the processor to:
    access a first memory address;
    determine the first memory address contains poison;
    notify an operating system of a consumption of the poison;
    receive from the operating system a first range of memory addresses associated with a process that is associated with the first memory address;
    determine a second memory address within the first range of memory addresses that contains a non-correctable memory error;
    initialize the second memory address within the first range of memory addresses; and
    test the second memory address within the first range to determine successful initialization.

13. The medium of claim 12 further comprising instructions which cause the processor to:
    disable poison monitoring;
    and
    send to the operating system a second range of memory addresses that were successfully initialized.

14. The medium of claim 12 further comprising instructions which cause the processor to:
    disable poison monitoring;
    and
    send to the operating system a third range of memory addresses that contains a non-correctable memory error.

15. The medium of claim 12 wherein the processor detects poison by consuming the poison, which causes a machine check exception.

16. The method of claim 1, wherein the testing of each address includes determining whether the respective address was able to store a value.

17. The method of claim 1, wherein the initializing of the range of memory addresses includes initializing an error-correcting-code bit to a known good value state.

18. The method of claim 1, wherein the initialization includes purging a cache line associated with the range of memory addresses.

19. The method of claim 7, wherein the indication of the memory address that was successfully initialized includes an indication that the memory address was tested to determine whether the memory address was successfully initialized to a value.

20. The method of claim 7 comprising:
    when the process cannot be recovered, sending, to the firmware, an indication that the process will not be recovered.

* * * * *